(12) United States Patent
Hui et al.

(10) Patent No.: US 9,348,363 B2
(45) Date of Patent: May 24, 2016

(54) COUNTERBALANCE SYSTEM FOR COMPUTER ASSEMBLY

(71) Applicant: Intel Corporation, Santa Clara, CA (US)

(72) Inventors: Michael Hui, Seattle, WA (US); Russell Aoki, Tacoma, WA (US); Anthony Valpiani, Graham, WA (US); Ralph Miele, Steilacoom, WA (US)

(73) Assignee: Intel Corporation, Santa Clara, CA (US)

( * ) Notice: Subject to any disclaimer, the term of this patent is extended or adjusted under 35 U.S.C. 154(b) by 153 days.

(21) Appl. No.: 14/142,826

(22) Filed: Dec. 28, 2013

(65) Prior Publication Data

US 2015/0185783 A1 Jul. 2, 2015

(51) Int. Cl.
*G06F 1/16* (2006.01)
*F16L 3/00* (2006.01)
*A47F 5/00* (2006.01)

(52) U.S. Cl.
CPC ............ *G06F 1/1624* (2013.01); *G06F 1/1616* (2013.01); *G06F 1/1626* (2013.01); *G06F 1/1632* (2013.01); *G06F 1/1633* (2013.01); *G06F 1/1656* (2013.01)

(58) Field of Classification Search
CPC ... G06F 1/1615; G06F 1/1616; G06F 1/1618; G06F 1/162; G06F 1/1624; G06F 1/1633
USPC ............... 361/679.01–679.3, 679.55–679.59; 248/121–123.2, 125.2, 917–924; 345/156, 157, 168, 169, 905
See application file for complete search history.

(56) References Cited

U.S. PATENT DOCUMENTS

| | | | | |
|---|---|---|---|---|
| 5,168,426 A | * | 12/1992 | Hoving | G06F 1/1681 16/361 |
| 6,903,927 B2 | * | 6/2005 | Anlauff | G06F 1/162 341/22 |
| 7,252,277 B2 | * | 8/2007 | Sweere | F16M 11/04 248/284.1 |
| 7,573,703 B2 | * | 8/2009 | Chuang | G06F 1/1626 361/679.21 |
| 8,672,277 B2 | * | 3/2014 | Hsu | F16M 11/10 248/121 |
| 8,770,538 B2 | * | 7/2014 | Hsu | G06F 1/1624 248/461 |
| 2004/0114315 A1 | * | 6/2004 | Anlauff | G06F 1/162 361/679.2 |

(Continued)

FOREIGN PATENT DOCUMENTS

| | | |
|---|---|---|
| TW | 201342016 A | 10/2013 |
| TW | M466461 U | 11/2013 |
| WO | 2013/100944 A1 | 7/2013 |

OTHER PUBLICATIONS

Hui, et al., "Stacking Detachable Tablet", PCT Patent Application No. PCT/US2013/052792, filed on Jul. 30, 2013, 49 pages.

(Continued)

*Primary Examiner* — Nidhi Thaker
(74) *Attorney, Agent, or Firm* — Alpine Technology Law Group LLC

(57) ABSTRACT

A computer assembly comprising a computer assembly base for the computer assembly, a rotatable display screen support coupled to the computer assembly base configured to receive a display screen and an base stabilizer of the computer assembly base configured to extend from a back side of the computer assembly base, wherein upon extension is configured to provide counterbalance support to the computer assembly base to inhibit tipping.

9 Claims, 7 Drawing Sheets

(56) References Cited

U.S. PATENT DOCUMENTS

| | | | |
|---|---|---|---|
| 2007/0030634 A1* | 2/2007 | Maskatia | G06F 1/1616 361/679.27 |
| 2012/0229962 A1* | 9/2012 | Chen | G06F 1/162 361/679.01 |
| 2014/0043746 A1* | 2/2014 | Lai | G06F 1/1624 361/679.17 |
| 2014/0049891 A1* | 2/2014 | Lee | G06F 1/1637 361/679.15 |
| 2014/0085814 A1* | 3/2014 | Kielland | A45F 3/02 361/679.55 |

OTHER PUBLICATIONS

Aoki, et al., "Detachable Forward Cradle Dock", PCT Patent Application No. PCT/US2013/052783, filed on Jul. 30, 2013, 34 pages.

Koser, et al., "Hinge Assembly", PCT Patent Application No. PCT/US2013/052751, filed on Jul. 30, 2013, 44 Pages.

Johnson, et al., "Frictional Hinge for Electronic Devices", U.S. Appl. No. 14/038,913, filed Sep. 27, 2013, 24 pages.

Bhowmik, et al., "Locking Hinge Assembly for Electronic Device", U.S. Appl. No. 13/976,173, filed Nov. 21, 2013, 40 pages.

* cited by examiner

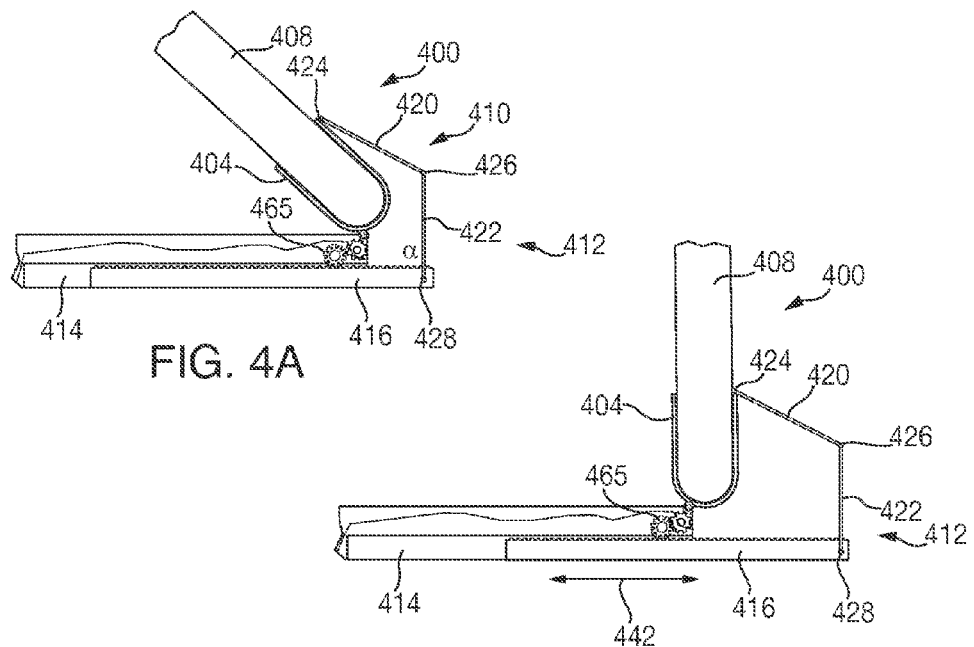
FIG. 4A
FIG. 4B
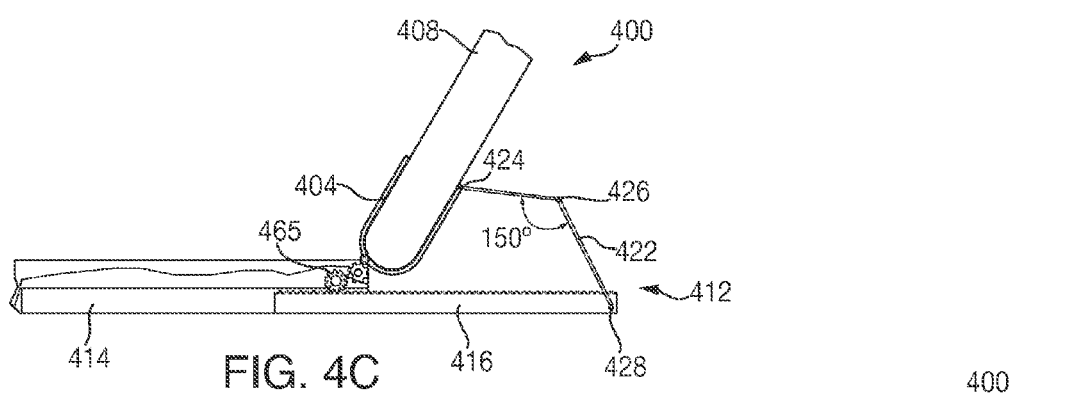
FIG. 4C
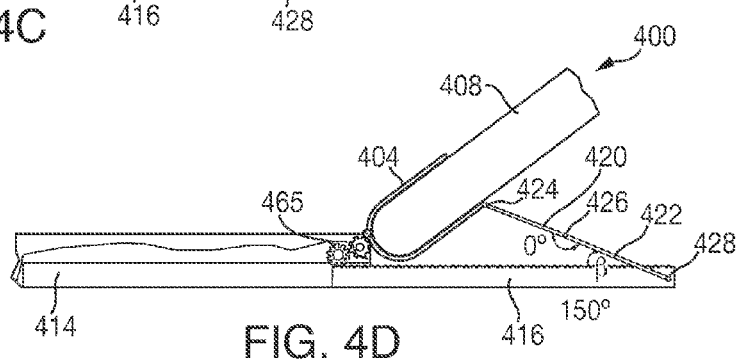
FIG. 4D

COUNTERBALANCE SYSTEM FOR COMPUTER ASSEMBLY

TECHNICAL FIELD

Examples described herein generally relate to methods, systems, and devices to provide a counterbalance member to inhibit tipping of clamshell type electronic devices including: PCs, notebooks, detachable tablets and keyboards, Ultrabook™ system, mobile phones and the like, or a combination thereof.

BACKGROUND

Notebook computers, convertible computers that can serve both as desktop and notebooks, notebooks and tablets having interconvertability, combinations thereof, clamshell style mobile phones and clamshell-style electronics of all kinds typically may have screens that are hinged to a base portion. The screen may or may not be detachable. In use such devices are typically in an open clamshell position. Because such form factors tend to have a majority of the weight in a screen portion these clamshell devices tend to be top-heavy and unstable. Clamshell devices may tip over backward in some cases due to this instability. Conventional solutions to prevent tipping include adding weight to a base portion and/or positioning the screen toward a center of the keyboard which reduces keyboard and touchpad footprint.

BRIEF DESCRIPTION OF THE DRAWINGS

The various advantages of the embodiments will become apparent to one skilled in the art by reading the following specification and appended claims, and by referencing the following drawings, in which:

FIGS. 4A-4D illustrate a side view of an example of a counterbalance system for a computer assembly;

DETAILED DESCRIPTION

Figure 1A:
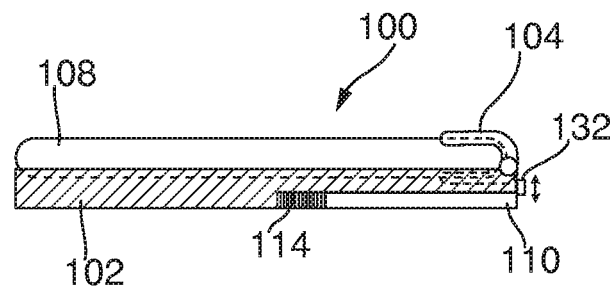
FIGS. 1A-1B illustrate a side view of an example of a counterbalance system for a computer assembly.
Figure 1B:
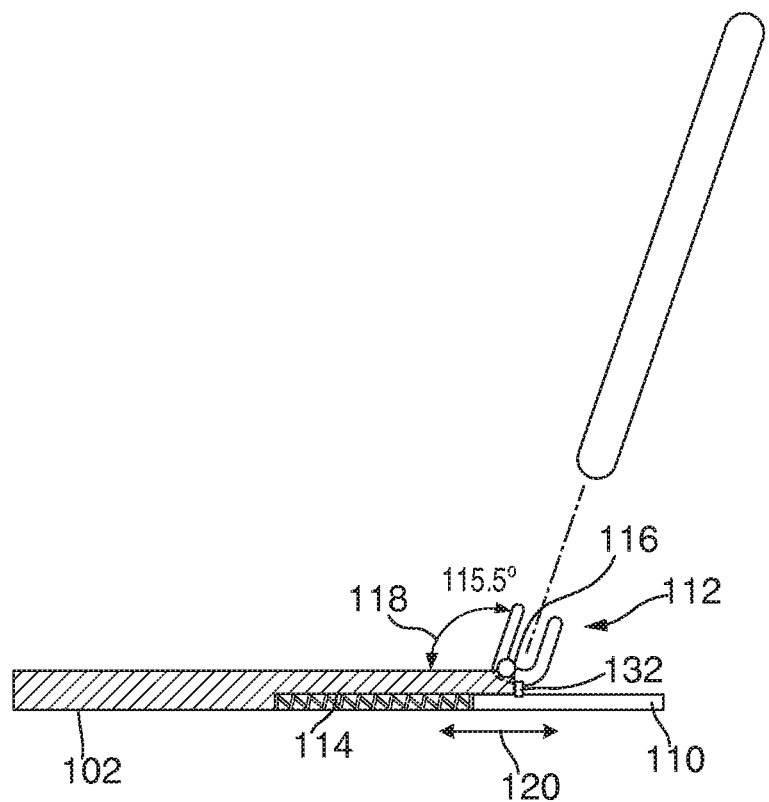

FIGS. 1A-1B illustrate an example of a counterbalance system for a computer assembly 100. Referring now to FIG. 1A, in an example, computer assembly 100 may comprise a computer assembly base 102, a rotatable display screen support 104 coupled to computer assembly base 102. Computer assembly base 102 may be configured to receive a display screen 108 and may further comprise a base stabilizer 110. Display screen 108 may be detachable and/or permanently coupled to rotatable display screen support 104. In another embodiment, computer assembly base 102 and display screen 108 may be permanently coupled in a clamshell device such as a laptop computer. As depicted in FIGS. 1A-1D base stabilizer 110 comprises an extendable spring biased plate. However, in one or more other examples, base stabilizer 110 may comprise an extendable rod and/or cylinder, a flexible sheet and/or a linking mechanism or the like or a combination thereof.

In an example, base stabilizer 110 may be solid, hollow, a mesh and/or may include one or more apertures, joints, and/or hinges. Base stabilizer 110 may comprise any of a variety of reasonable shapes and lengths. As described in greater detail below, base stabilizer 110 may comprise a folding sheet, malleable material, a flexible bi-stable spring and/or a linking mechanism. Base stabilizer 110 may comprise a variety of materials including at least one of cloth, metal, metal alloy, carbon fiber, wood, plastic, shape-retaining plastic, layered cloth, layered metal, layered plastic and the like or a combination thereof.

In an example, base stabilizer 110 may be locked in a retracted position within slot 114 by a fastener 132 which when moved out of a locked position may release base stabilizer 110. Fastener 132 may comprise any of a variety of fasteners including a latch, a catch, a clasp, an actuator, a lock, a lever, a hook, a button, and/or the like or a combination thereof.

Referring now to FIG. 1B, in an example computer assembly 100 with display screen 108 may be in an upright or "clamshell" position. Rotatable display screen support 104 may be configured to pivot at a connection point 116 between computer assembly base 102 and rotatable display screen support 104. Connection point 116 may comprise a hinge and/or joint or other connector. Rotatable display screen support 104 may rotate about connection point 116, at an angle 118 of at least between about zero degrees and 90° or more.

In an example, display screen 108 may comprise a glass screen as well as many of the electronic components of computer assembly 100 enabling display screen 108 to function as a computing device independently of computer assembly base 102. Display screen 108 may comprise a tablet, an Ultrabook™ system, a mobile phone or the like or a combination thereof. Computer assembly base 102 may comprise a keyboard and/or touchpad having little mass under the keyboard and/or touchpad and may weigh substantially less than display screen 108. Thus, computer assembly 100 may be unstable when display screen 108 is disposed in rotatable display screen support 104 and in the clamshell position. Such instability may leave computer assembly susceptible to tipping over. Instability may increase as angle 118 increases beyond about 90°.

In an example, base stabilizer 110 may be disposed within a slot 114 at a back side 112 of computer assembly base 102. Base stabilizer 110 may be configured to retract and/or extend into and/or out of a slot 114 in back side 112 of computer assembly base 102. When extended, base stabilizer 110 may provide counterbalance support to computer assembly base 102 to provide stability and inhibit lifting of computer assembly base 102 as angle 118 increases beyond about 90° causing tipping of computer assembly 100.

In an example, base stabilizer 110 may be configured to extend to various lengths along a plane 120 parallel to a bottom surface of computer assembly base 102 to provide counterbalance support to inhibit lifting of computer assembly base 102 from plane 120. The length to which base stabilizer 110 is configured to extend may be proportional to angle 118 and/or a weight of the display screen 108. Base stabilizer 110 may be moved into and/or out of slot 114 manually, mechanically, and/or electro-mechanically by at least one of manual manipulation, an electronic or mechanical actuator, gears, a spring, a lever and/or the like or a combination thereof.

Figure 1C:
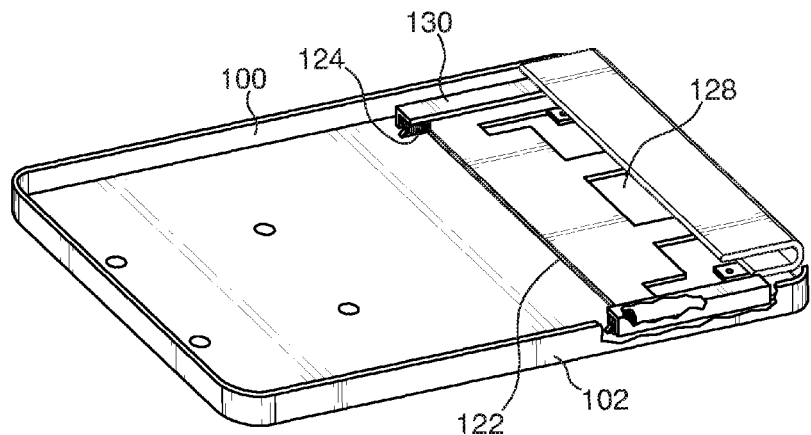
FIGS. 1C-1D illustrate a cutaway view of an example of a spring-biased plate in a counterbalance system for a computer assembly.
Figure 1D:
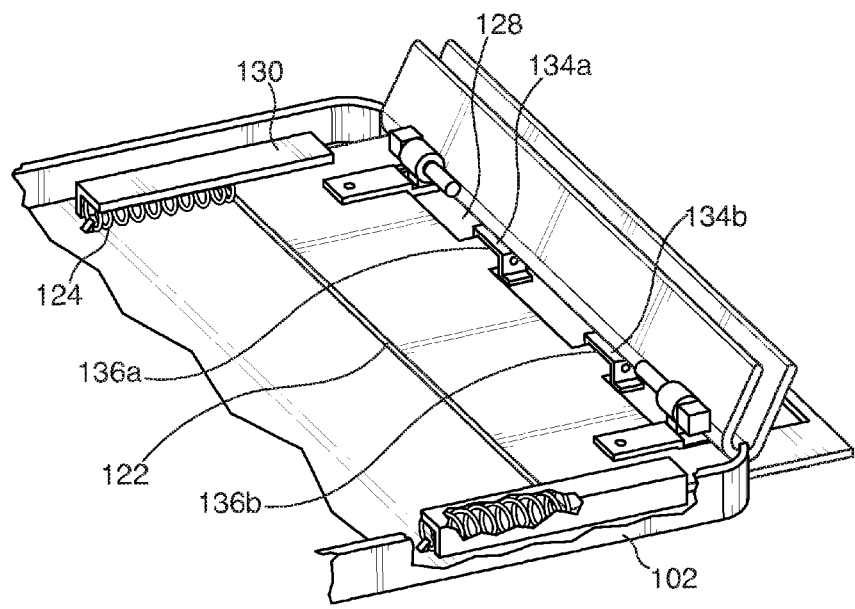

FIGS. 1C-1D illustrate a cutaway view of an example of a plate 122 in a counterbalance system for a computer assembly 100. Referring now to FIG. 1C, in an example plate 122 may be a spring biased plate and may reside within computer assembly base 102 of computer assembly 100. Plate 122 is shown in a retracted position. In an example, base stabilizer 110 may comprise a plate 122 and spring 124. Plate 122 may be coupled to spring 124 which may provide a spring force sufficient to extend plate 122 out of slot 114 in back side 112 of computer assembly base 102. Plate 122 may be held in a retracted position by fastener 132 (see FIG. 1). Plate 122 may comprise one or more apertures 128 to reduce weight and/or cost of manufacture. Plate 122 may be coupled to track 130 configured to guide plate 122 into and out of slot 114. Plate 122 may be coupled to track 130 such that a user may attach or remove plate 122 from track 130.

Referring now to FIG. 1D, in an example plate 122 may be released from a retracted position, for example, if fastener 132 is disengaged. Upon release, plate 122 may be extended behind computer assembly base 102. Brackets 134a and 134b may engage plate 122 at central plate portions 136a and 136b. Brackets 134a and 134b may be configured to guide plate 122 as it extends from slot 114.

Figure 2A:
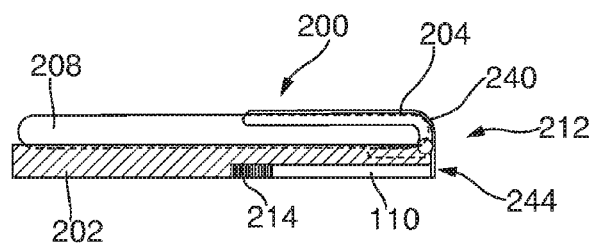
FIGS. 2A-2C illustrate a side view of an example of a counterbalance system for a computer assembly.
Figure 2B:
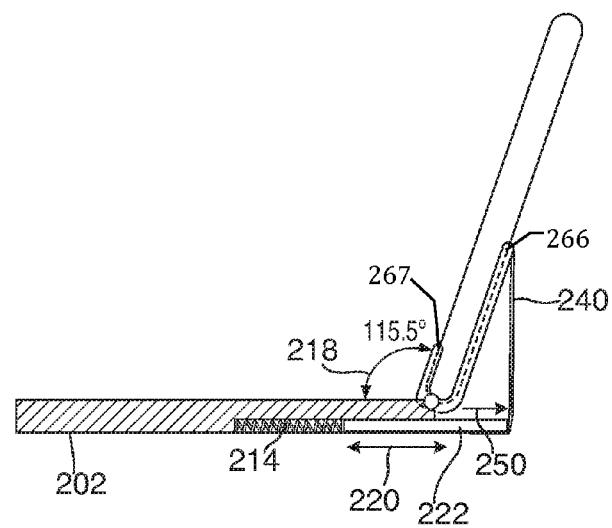
Figure 2C:
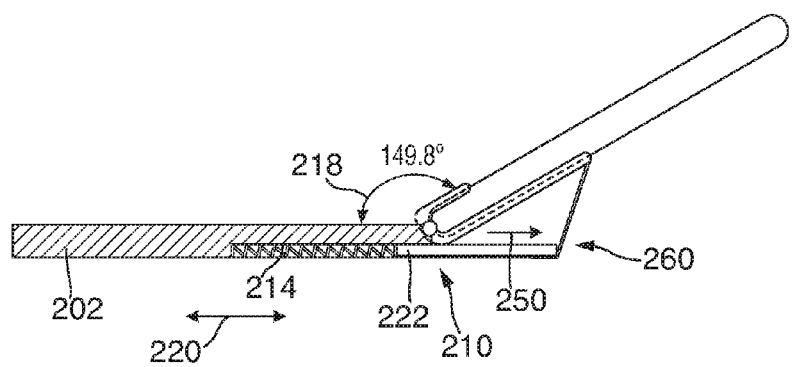

FIGS. 2A-2C illustrate a side view of an example of a counterbalance system for a computer assembly. Referring now to FIG. 2A, in an example, computer assembly 200 may comprise a computer housing base 202, a display screen housing 204 coupled to computer housing base 202. Display screen housing 204 may be configured to receive a display screen 208. In an example, display screen 208 may be detachable. In another example display screen 208 may be permanently coupled within display screen housing 204. In an example, a computer assembly 200 may be in a closed clamshell position where display screen 208 may be parallel with a top surface of computer housing base 202. Computer housing base 202 may further comprise a base stabilizer 210 comprising a plate 222. Plate 222 may comprise an extendable spring biased plate. Plate 222 may be configured to extend from and retract into slot 214. A flexible sheet 240 may be coupled to a first outside surface 242 of display screen housing 204 and a second outside surface 244 of computer housing base 202. The flexible membrane may be coupled such that it may be removed or may be permanently fixed to the a first outside surface 242 of display screen housing 204 and a second outside surface 244 of computer housing base 202. The flexible membrane may be coupled with Velcro®, glue, and or thermoplastics, or the like or a combination thereof.

In an example, flexible sheet 240 may comprise a variety of materials including at least one of layered cloth, layered stainless steel, shape-retaining plastic, metal, metal alloy, carbon fiber, wood, plastic and the like or combinations thereof. Flexible sheet 240 may be as wide as a full length of backside 212 of computer housing base 202 or may be of shorter width. For example, flexible sheet 240 may be about 3.0 to 5.0 cm. wide. In one example, computer housing base 202 may comprise more than one flexible sheet 240 spaced at intervals and or disposed at the corners of computer housing base 202.

Referring now to FIG. 2B in an example, computer assembly 200 may be in an open clamshell position where display screen 208 may be perpendicular with a top surface of computer housing base 202. In one example, plate 222 may be configured to extend along a plane 220 parallel to a bottom surface of computer housing base 202. Plate 222 may be configured to come into contact with flexible sheet 240 upon extension. Flexible sheet 240 may be configured to increase slack as an angle 218 between computer housing base 202 and display screen housing 204 increases. In an example, a back portion 266 of computer display screen housing 204 may be a different length than a front portion 267 of display screen housing 204. Flexible sheet 240 may be configured to receive plate 222 upon extension. Flexible sheet 240 may be configured to envelope plate 222 when in an extended position. Plate 222 may apply a spring force 250 against flexible sheet 240 upon extension. Spring force 250 may put tension on the slack in flexible sheet 240 sufficient to substantially straighten flexible sheet 240 and prevent plate 222 from extending beyond the tensioned flexible sheet 240.

Referring now to FIG. 2C, in an example, computer assembly 200 may be in an open clamshell position with angle 218 greater than about 140°. Because slack increases in flexible sheet 240 as angle 218 increase, as angle 218 increases a length plate 222 extends out of slot 214 may also increase. As the extension of plate 222 increases, tension on flexible sheet 240 may be maintained by force 250.

Figure 2D:
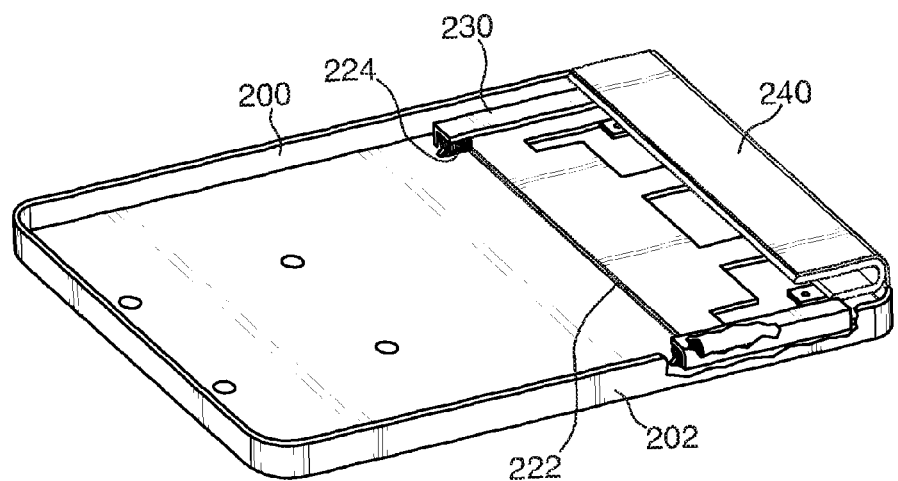
FIGS. 2D-2E illustrate a cutaway view of an example of a spring-biased plate in a counterbalance system for a computer assembly.
Figure 2E:
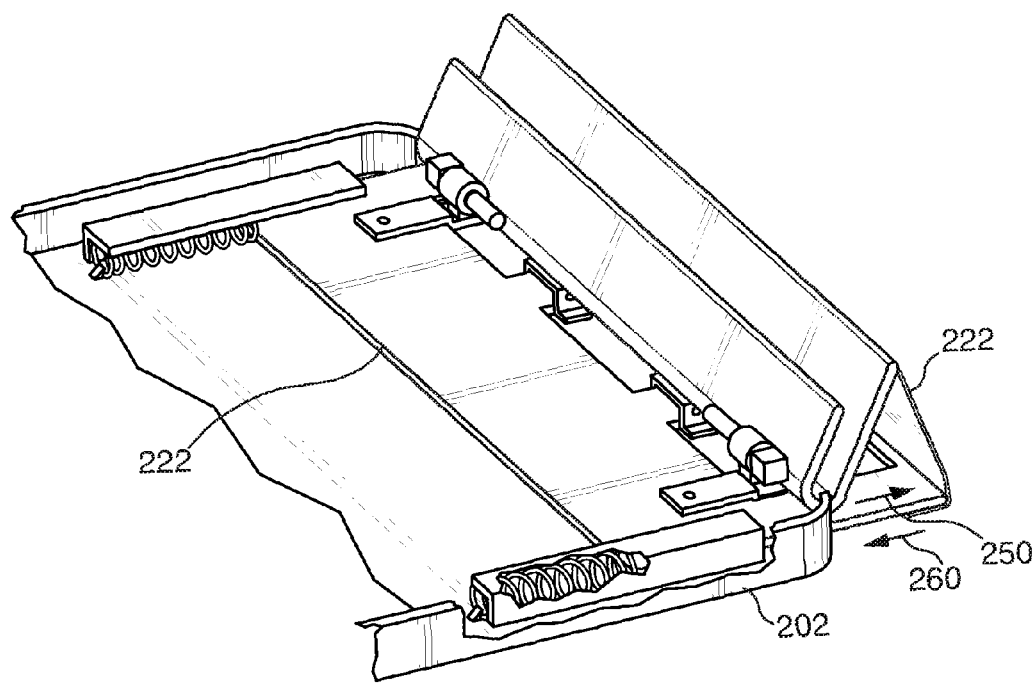

FIGS. 2D-2E illustrate a cutaway view of an example of a spring-biased plate in a counterbalance system for a computer assembly 200. Referring to FIG. 2D, in an example computer assembly 200 may be in a closed position. Plate 222 may be retracted within computer housing base 202 of computer assembly 200 when computer assembly 200 is in the closed clamshell position. Flexible sheet 240 may hold plate 222 in the retracted position by applying a force 260 against plate 222. Plate 222 may be coupled to spring 224 which may provide a spring force 250 sufficient to extend plate 222 out of slot 214 and into flexible sheet 240.

FIG. 2E illustrates a magnified cutaway view of an example of plate 222 within computer housing base 202 of computer assembly 200 when computer assembly 200 is in an open clamshell position. As depicted, tension on flexible sheet 240 applied by spring force 250 of plate 222 may be sufficient to keep tension on flexible sheet 240 and may prevent plate 222 from extending beyond flexible sheet 240.

Figure 3A:
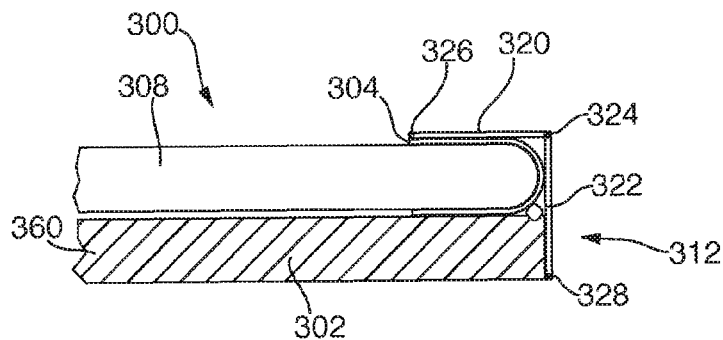
FIGS. 3A-3C illustrate a side view of an example of a counterbalance system for a computer assembly.

FIG. 3A illustrates a side view of a computer assembly 300 comprising a computer assembly base 302 and a rotatable display screen support 304 coupled to base stabilizer 310. As depicted, computer assembly 300 comprises a single base stabilizer 310. In another example, computer assembly 300 may include more than one of base stabilizers 310. In an example, rotatable display screen support 304 may be coupled to computer assembly base 302 at a point 380 that may be substantially on a top surface of back side 312.

Figure 3B:
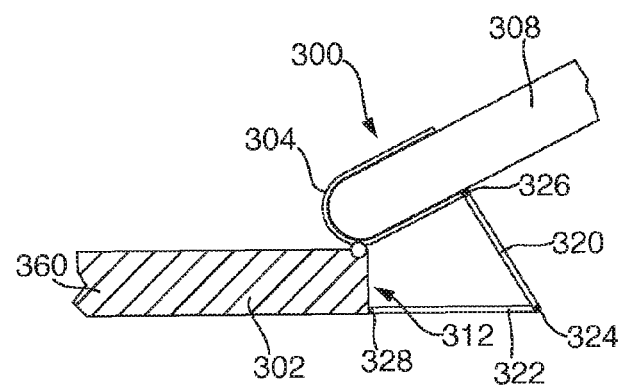

FIG. 3B illustrates a side view of a computer assembly 300. In an example, base stabilizer 310 may be configured to provide a counterbalance support to computer assembly base 302. When display screen 308 is coupled to rotatable display screen support 304, display screen 308 may pivot in rotatable display screen support 304 such that angle 318 may be greater than about 90°. If angle 318 may be greater than about 90°, computer assembly base 302 may become unstable causing a front side 360 to tip upward. Base stabilizer 310 may be configured to fold out behind computer assembly base 302 to provide counterbalance support to inhibit tipping of computer assembly base 302.

In an example, base stabilizer 310 may comprise at least a first link member 320 and a second link member 322 coupled via a first hinge 324. In an example, base stabilizer 310 is described herein as comprising two link members. However, base stabilizer 310 is not limited to two link members and may comprise any reasonable number of link members as would occur to a person skilled in the art.

In an example, first link member 320 and/or second link member 322 may be rigid, flexible and/or malleable. First link member 320 and/or second link member 322 may comprise any of a variety of materials including at least one of a layered flexible material, cloth, shape-retaining plastic, plastic, metal, metal alloy, carbon fiber, wood, plastic and the like or combinations thereof. First link member 320 and/or second link member 322 may comprise a spring, such as for example, a J spring and/or bi-stable spring.

In an example, first link member 320 and second link member 322 may comprise any of a variety of reasonable shapes and lengths. For example, first link member 320 and second link member 322 may comprise one or more sheets extending a full length of a backside 312 of computer assembly base 302. In another example, first link member 320 and second link member 322 may comprise one or more rods, cylinders, and/or sheets having any of a variety of widths. For example, first link member 320 and/or second link member 322 may comprise square 0.5 centimeter (cm)×0.5 cm×3.0 cm rods, 15.0 millimeter (mm)×2.0 cm×4.0 cm sheets and/or 0.5 cm diameter×2.5 cm cylinders.

In an example, first link member 320 and second link member 322 may be configured to foldout behind computer assembly base 302 when an angle 318 may be greater than about zero degrees. In an example, first link member 320 may be coupled to rotatable display screen support 304 via a second hinge 326 and second link member 322 may be coupled to computer assembly base 302 via a third hinge 328. First hinge 324, second hinge 326 and/or third hinge 328 may comprise any of a variety of hinges including a frictionless hinge, a stop hinge and/or a constant torque friction hinge, or the like or a combination thereof.

Figure 3C:
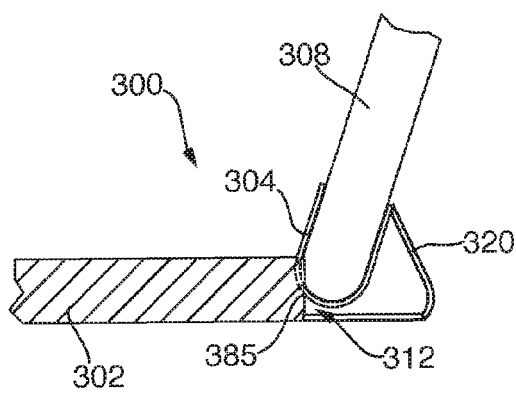

FIG. 3C illustrates an example of a side view of computer assembly 300. In an example, first link member 320 may comprise a J spring. Rotatable display screen support 304 may be coupled to computer assembly base 302 at a point 385 that may be substantially in a center of back side 312.

In an example, a J spring of first link member 320 may be selected based on the following criteria: spring force of J spring may be such that it may be large enough to react to a tipping force and a touch force (the force exerted on display screen 308 by a user) and small enough to not lift computer assembly base 302 without a touch force and to not move display screen without a touch force.

In an example, the J spring of link member 320 may have a stiffness that may be tuned such that it meets the following criteria: spring stiffness may be strong enough to counter tipping and may be variable with screen angle and dependent on load condition. For example, for an assumed low touch force conditions less than 0.3 lbf (pounds force), a required stiffness may increase with angle 318 because the system center of gravity may be shifted at a greater rate than the J spring can react. For assumed high touch force conditions greater than 0.4 lbf, a required stiffness of J spring may decrease with angle 318 because the high touch force requires a proportionately larger spring reaction force at low angles. At high angles J spring may compress enough to exceed the required load. In an example, the about 0.3 lbf to about 0.4 lbf touch force range, the spring stiffness may be close to linear.

FIGS. 4A-4D illustrate a side view of an example of a computer assembly 400 comprising a computer assembly base 402 and a rotatable display screen support 404 coupled to base stabilizer 410. Referring now to FIG. 4A, rotatable display screen support 404 may be configured to receive a display screen 408 or display screen 408 may be fixed to rotatable display screen support 404. In an example, base stabilizer 410 may comprise at least a first link member 420 and a second link member 422 coupled via a first hinge 424. First link member 420 may be coupled to rotatable display screen support 404 via first hinge 424. Second link member 422 may be coupled second link member 422 via second hinge 426. Second link member 422 may be coupled to a rod 416 via third hinge 428. First hinge 424 may be a frictionless slip hinge configured to have a hinge range between about zero degrees to about 145°. Second hinge 426 may be a frictionless slip hinge configured to have a hinge range between about 90° to about 180°. Rod 416 may be disposed within a slot 414 at to back side 412 of computer assembly base 402 via a third hinge 428. In an example, an opening of slot 414 may face back side 412. If rod 416 is retracted into slot 414 an angle $\alpha$ between rod 416 and second link member 422 may be about 90°. Third hinge 428 may be a frictionless slip hinge and may be configured to have a hinge range between about zero degrees to about 90°.

Referring now to FIG. 4B, rod 416 may be configured to extend to various lengths behind computer assembly base 402 along a plane 442 parallel to a bottom surface of computer assembly base 402. Rod 416 may be configured to provide counterbalance support to computer assembly base 402 to inhibit tipping backward of computer assembly base 402.

Referring to FIG. 4C, in an example, as angle 418 increases first hinge 424 and second hinge 426 may be configured to draw rod 416 out of slot 414. Likewise, as angle 418 decreases first hinge 424 and second hinge 426 may be configured to push rod 416 back into slot 414.

In another example, one or more gears 465 may be configured to mechanically extend and/or retract rod 416. Gears 465 may be coupled to rotatable display screen support 404 and may extend and/or retract rod 416 in proportion to a magnitude of angle 418. First link member 420 and second link member 422 may be configured to straighten and/or fold responsive to extension and/or retraction of rod 416.

Referring to FIG. 4D, in an example, rod 416 may be extended out of slot 414 and an angle $\beta$ between rod 416 and second link member 422 may be less than about 90°. In one example, the angle between rod 416 and second link member 422 may be about 45°. When rod 416 is extended out of slot 414 an angle $\theta$ between first link member 420 and second link member 422 may be greater than about 90°.

Figure 5A:
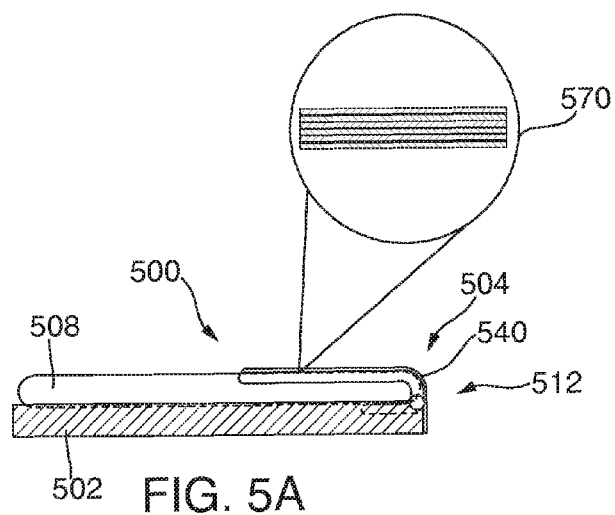
FIGS. 5A-5C illustrate a side view of an example of a counterbalance system of a computer assembly.
Figure 5B:
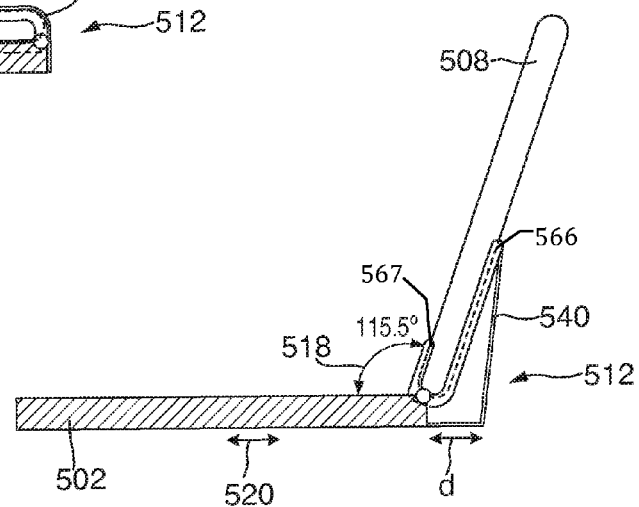
Figure 5C:
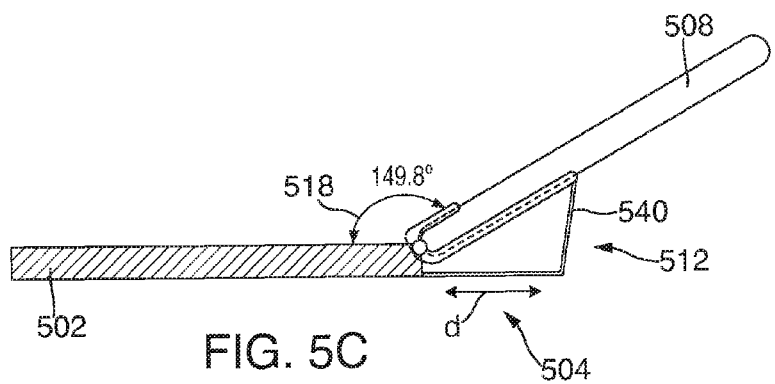

FIGS. 5A-5C illustrate a side view of an example of a counterbalance system of a computer assembly 500 comprising a computer assembly base 502 and a rotatable display screen support 504 coupled to base stabilizer 510.

Referring now to FIG. 5A, display screen 508 may be permanently coupled to rotatable display screen support 504 or may be coupled such that the display screen may be removed. In an example, a flexible membrane 540 may be coupled to a back side 512 of computer assembly 500 at computer assembly base 502 and display screen rotatable support 504. Flexible membrane 540 may be configured to provide counterbalance support to computer assembly base 502 to inhibit tipping. Flexible membrane 540 may be configured to be malleable and to retain a particular shape to provide the counter balance support sufficient to inhibit tipping of computer assembly 500.

In an example, flexible membrane 540 may comprise a folding sheet, a shape-retaining material, and/or a flexible bi-stable spring, or the like or combinations thereof. Flexible membrane 540 may comprise any of a variety of materials including at least one of a layered material, layered cloth, layered metal, a shape-retaining plastic, metal, metal alloy, and/or carbon fiber. In an example, such layered material, layered cloth and/or layered metal may be arranged such that thin layers 570 of the material, cloth and/or metal are stacked. Layers 570 may be flexible such that flexible membrane may be manipulated into a particular shape. In between layer 570 a coefficient of friction may be sufficient to enable the flexible membrane to retain its shape once manipulated. Forces associated with such manipulation may be sufficient to overcome the coefficient of friction and when those forces are no longer present the coefficient of friction between the layers may be sufficient to hold a particular shape of flexible membrane 540 and provide counterbalance support to inhibit tipping of computer assembly base 502 due to instability and or user touch forces.

Referring now to FIG. 5B, in an example, as angle 518 increases flexible membrane 540 may move away from an outer surface of back side 512. Flexible membrane 540 may be configured to retain an L shape wherein a bottom surface of flexible membrane 540 may extend a distance d in parallel with a plane 520 parallel to a bottom surface of computer assembly base 502. In an example, a back portion 566 of computer display screen support 504 may be a different length than a front portion 567 of display screen support 504.

Referring now to FIG. 5C, in an example, as angle 518 increases further, flexible membrane 540 may move away from an outer surface of back side 512. Flexible membrane 540 may be configured to increase distance d and retain the L shape.

In an example, a computer assembly may comprise a base, a display screen support configured to rotate about an axis couple to the base configured to receive a display screen, and a stabilizer configured to extend from a back side of the base, wherein the stabilizer may be configured to provide counterbalance support to the base. In an example, the display screen support may be configured to pivot at a connection point between the base and the display screen support. In an example, the display screen support may be configured to pivot at the connection point between the base and the display screen support at an angle of at least between about zero and 130 degrees. The stabilizer may comprise a plate disposed within a slot opening to the back side of the base. The stabilizer may be configured to extend to various lengths along a plane parallel to a bottom surface of the base to provide the counterbalance support to the base. In an example, a length to which the stabilizer may be configured to extend may be in proportion to the angle of the display screen support and/or in proportion to a weight of the display screen. The plate may be a spring biased plate. The base may comprise a keyboard or a touch pad, or a combination thereof. The computer assembly may be a detachable notebook computer or tablet. The display screen support may be coupled to the base proximate the back side.

In an example, a computer housing may comprise a base coupled to a display screen housing configured to rotate about an axis, a display screen disposed in the display screen housing, and a stabilizer disposed at a back side of the base may be configured to extend from a back side portion of the base, wherein the stabilizer may be configured to provide counterbalance support to the computer housing. In an example, the stabilizer may comprise a plate configured to retract into and extend from a slot opening to a back side surface of the base, wherein the plate may be configured to provide the counterbalance support to the computer housing. The stabilizer may further comprise a flexible membrane coupled to a first outside surface of the display screen housing and a second outside surface of the computer housing base, wherein the flexible membrane may be configured to envelope the plate. The flexible membrane may be configured to increase slack as an angle between the base and the display screen housing increases. In an example, the plate may be a spring biased plate, wherein if the plate may be released, the plate may be configured to extend along a plane parallel with a bottom surface of the base and apply a spring force against the flexible membrane, wherein the spring force may be sufficient to tension the slack in the flexible membrane sufficient to straighten the flexible membrane and prevent the plate from extending beyond the tensioned flexible membrane.

In an example, a computer assembly may comprise a base comprising a keyboard, a display screen support configured to rotate about an axis configured to receive a display screen, wherein the display screen support may be coupled to the base at a connection point positioned at a back portion of the base, and a stabilizer comprising a first link member and a second link member, the stabilizer may be configured to fold out from a back side of the base to provide a counterbalance extension for the base. In an example, the first link member may be coupled to the second link member via a first hinge and may be configured to fold out when an angle between the base and the display screen support may be greater than about zero degrees. In another other example, the display screen support may be configured to pivot at the connection point at an angle between about zero and 130 degrees. In an example, the first link member and the second link member may be rigid or the first link member may be flexible and the second link member may be rigid or the first link member may be rigid and the second link member may be flexible. The first link member may be a J spring. The first link member may be coupled to the display screen support via a second hinge and the second link member may be coupled to the computer assembly base via a third hinge. The first hinge, the second hinge and/or the third hinge may be frictionless. The first hinge, the second hinge and/or the third hinge may be stop hinges. The base may comprise a rod disposed within a slot opening to the back side of the base, wherein the rod may be configured to extend out of and retract into the slot and wherein the first link member may be coupled to the display screen support via a second hinge and the second link member may be coupled to the rod via a third hinge. The rod may be configured to extend to various lengths behind the base along a plane parallel to a bottom surface of the base to provide a counterbalance support to the base and wherein the first link member and the second link member may be configured to fold responsive to extension of the rod. The third hinge may be a frictionless slip hinge and may be configured to have a hinge range between about zero degrees to 90°. In an example, when the rod is retracted into the slot a first angle between the rod and the second link member may be about 90° and when the rod is extended out of the slot a second angle between the rod and the second link member may be less than 90°. The first hinge may be a frictionless slip hinge configured to have a hinge range between about 90° to 180°. In an example, when the rod is retracted into the slot a first angle between the first link member and the second link member may be about 90° and when the rod is extended out of the slot a second angle between the first link member and the second link member may be greater than about 90°.

In an example, a computer assembly may comprise a base for the computer assembly, a display screen support configured to rotate about an axis, coupled to the base and configured to receive a display screen, and a flexible membrane coupled to the base and display screen support, wherein the flexible membrane may be configured to provide counterbalance to the base. The flexible membrane may be configured to be malleable and to retain a particular shape. The flexible membrane may comprise a folding sheet, a shape-retaining material, and/or a flexible bi-stable spring. In an example, the flexible membrane may comprise a layered cloth, a layered metal, a metal, a metal alloy, a plastic, a shape-retaining plastic or a carbon fiber, or a combination thereof.

In an example, a system for providing a counterbalance means for a computer assembly may comprise a means for providing support to a computer assembly comprising a base and a display screen housing wherein the means for providing the support includes means for coupling a means for stabilizing the computer assembly to the housing proximate a backside portion of the computer assembly such that the stabilizer may be arranged to extend outwardly from a backside of the housing, and wherein the means for stabilizing may be configured to provide counterbalance support to the computer assembly.

In an example, a system for providing counterbalance support to a computer assembly may comprise a base comprising a display screen housing coupled to the base, wherein the computer assembly may be configured to be coupled to a display screen, a display screen disposed in the display screen housing, and a stabilizer coupled to the base configured to extend from a backside of the base, wherein the stabilizer may be configured to provide counterbalance support to the base.

In an example, a method for providing a counterbalance for a computer assembly may comprise providing support to the computer assembly comprising a base and a display screen housing, and coupling an extending portion to the base and/or display screen housing configured to provide counterbalance support to the computer assembly from a backside portion of the base wherein the extending portion may be configured to project outwardly from the backside portion of the base and/or display screen housing.

In an example, a machine readable medium including code may, when executed, cause a machine to perform a method including providing support to the computer assembly comprising a base and a display screen housing, and coupling an extending portion to the base and/or display screen housing configured to provide counterbalance support to the computer assembly from a backside portion of the base wherein the extending portion may be configured to project outwardly from the backside portion of the base and/or display screen housing.

Having described and illustrated the principles of examples, it should be apparent that the examples may be modified in arrangement and detail without departing from such principles. We claim all modifications and variation coming within the spirit and scope of the following claims.

We claim:

1. A computer assembly comprising: a base; a display screen support configured to rotate about an axis, coupled to the base, and configured to receive a display screen; and a stabilizer configured to extend from a back side of the base, wherein the stabilizer is configured to provide counterbalance support to the base; wherein the stabilizer comprises a plate disposed within a slot at the back side of the base, wherein the plate is a spring biased plate; and wherein the stabilizer is configured to extend to various lengths along a plane parallel to a bottom surface of the base to provide the counterbalance support to the base.

2. The computer assembly of claim 1, wherein the display screen support is configured to pivot at a connection point between the base and the display screen support at an angle of at least between about zero and about 130 degrees.

3. The computer assembly of claim 2, wherein a length to which the stabilizer is configured to extend is in proportion to the angle of the display screen support.

4. The computer assembly of claim 1, wherein the length to which the stabilizer is configured to extend is in proportion to a weight of the display screen.

5. The computer assembly of claim 1, wherein the display screen support is configured to pivot at a connection point between the base and the display screen support.

6. A computer housing comprising: a base coupled to a display screen housing configured to rotate about an axis; a display screen able to be disposed in the display screen housing; and a stabilizer disposed at a back side of the base configured to extend from a back side portion of the base, wherein the stabilizer is configured to provide counterbalance support to the computer housing; wherein the stabilizer comprises a plate disposed within a slot at the back side of the base, wherein the plate is a spring biased plate; and wherein the stabilizer is configured to extend to various lengths along a plane parallel to a bottom surface of the base to provide the counterbalance support to the base.

7. The computer housing of claim 6, wherein the display screen is configured to pivot at a connection point between the base and the display screen at an angle of at least between about zero and about 130 degrees.

8. The computer housing of claim 6, wherein a length to which the stabilizer is configured to extend is in proportion to the angle of the display screen.

9. The computer housing of claim 6, wherein a length to which the stabilizer is configured to extend is in proportion to a weight of the display screen.

* * * * *